(12) United States Patent
Patel et al.

(10) Patent No.: US 7,295,363 B2
(45) Date of Patent: Nov. 13, 2007

(54) OPTICAL COATING ON LIGHT TRANSMISSIVE SUBSTRATES OF MICROMIRROR DEVICES

(75) Inventors: Satyadev Patel, Sunnyvale, CA (US); Peter Heureux, Felton, CA (US); Jonathan Doan, Mountain View, CA (US); Regis Grasser, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 165 days.

(21) Appl. No.: 11/102,531

(22) Filed: Apr. 8, 2005

(65) Prior Publication Data

US 2006/0227406 A1     Oct. 12, 2006

(51) Int. Cl.
*G02B 26/00*     (2006.01)

(52) U.S. Cl. .................. 359/291; 359/295; 359/298; 359/224

(58) Field of Classification Search ............ 359/223, 359/224, 290–295, 298; 345/48, 84, 85, 345/108; 348/750, 755, 770, 771
See application file for complete search history.

(56) References Cited

U.S. PATENT DOCUMENTS

| | | | |
|---|---|---|---|
| 3,517,126 A | 6/1970 | Yamada et al. |
| 3,553,364 A | 1/1971 | Lee |
| 3,600,798 A | 8/1971 | Lee |
| 3,678,196 A | 7/1972 | Roth |
| 3,746,785 A | 7/1973 | Goodrich |
| 3,746,911 A | 7/1973 | Nathanson et al. |
| 3,886,310 A | 5/1975 | Guldberg et al. |
| 4,229,732 A | 10/1980 | Hartstein et al. |
| 4,280,107 A | 7/1981 | Scifres et al. |
| 4,356,730 A | 11/1982 | Cade |
| 4,383,255 A | 5/1983 | Grandjean et al. |
| 4,403,248 A | 9/1983 | Te Velde |
| 4,420,897 A | 12/1983 | Castleberry |
| 4,492,435 A | 1/1985 | Banton et al. |
| 4,566,935 A | 1/1986 | Hornbeck |
| 4,571,603 A | 2/1986 | Hornbeck et al. |
| 4,592,628 A | 6/1986 | Altman et al. |
| 4,596,992 A | 6/1986 | Hornbeck |
| 4,662,746 A | 5/1987 | Hornbeck |
| 4,677,311 A | 6/1987 | Morita |

(Continued)

OTHER PUBLICATIONS

Jaecklin, "Line-Addressable Torsional Micromirrors for Light Modulator Arrays", Sensor and Actuators A, 41-42, Elsevier Science, pp. 324-329, 1994.

(Continued)

*Primary Examiner*—Evelyn A. Lester
(74) *Attorney, Agent, or Firm*—Wade James Brady, III; Frederick J. Telecky, Jr.

(57) ABSTRACT

Disclosed herein is method of operating a device that comprises an array of micromirrors. The method comprises a process usable for repairing stuck micromirrors of the micromirror array during the operation. The reparation process applies, at the ON state, two consecutive refresh voltages to the mirror plates of the micromirrors in the array with the pulses being separated in time longer than the characteristic oscillation time of the micromirrors. The reparation process can be applied independently to the micromirrors. Alternatively, the reparation process can be incorporated with a bias inversion process.

36 Claims, 6 Drawing Sheets

U.S. PATENT DOCUMENTS

| | | |
|---|---|---|
| 4,680,579 A | 7/1987 | Ott |
| 4,698,602 A | 10/1987 | Armitage |
| 4,710,732 A | 12/1987 | Hornbeck |
| 4,786,149 A | 11/1988 | Hoenig et al. |
| 4,805,038 A | 2/1989 | Seligson |
| 4,954,789 A | 9/1990 | Sampsell |
| 4,956,619 A | 9/1990 | Hornbeck |
| 4,998,262 A | 3/1991 | Wiggers |
| 5,061,049 A | 10/1991 | Horbeck |
| 5,078,479 A | 1/1992 | Vuilleumier |
| 5,085,497 A | 2/1992 | Um et al. |
| 5,196,767 A | 3/1993 | Leard et al. |
| 5,198,920 A | 3/1993 | Gobeli et al. |
| 5,216,537 A | 6/1993 | Hornbeck |
| 5,285,407 A | 2/1994 | Gale et al. |
| 5,287,215 A | 2/1994 | Warde et al. |
| 5,303,190 A | 4/1994 | Pelley, III |
| 5,311,360 A | 5/1994 | Bloom et al. |
| 5,416,514 A | 5/1995 | Janssen et al. |
| 5,442,414 A | 8/1995 | Janssen et al. |
| 5,444,566 A | 8/1995 | Gale et al. |
| 5,448,314 A | 9/1995 | Heimbuch et al. |
| 5,452,024 A | 9/1995 | Sampsell |
| 5,471,341 A | 11/1995 | Warde et al. |
| 5,493,439 A | 2/1996 | Engle |
| 5,500,759 A | 3/1996 | Coleman |
| 5,508,738 A | 4/1996 | Janssen et al. |
| 5,517,347 A | 5/1996 | Sampsell |
| 5,535,047 A | 7/1996 | Hornbeck |
| 5,552,925 A | 9/1996 | Worley |
| 5,557,177 A | 9/1996 | Engle |
| 5,567,334 A | 10/1996 | Baker et al. |
| 5,579,149 A | 11/1996 | Moret et al. |
| 5,579,151 A | 11/1996 | Cho |
| 5,583,688 A | 12/1996 | Hornbeck |
| 5,631,782 A | 5/1997 | Smith et al. |
| 5,636,070 A | 6/1997 | Ji et al. |
| 5,669,687 A | 9/1997 | Yang |
| 5,677,784 A | 10/1997 | Harris |
| 5,706,061 A | 1/1998 | Marshall et al. |
| 5,745,193 A | 4/1998 | Urbanus et al. |
| 5,768,009 A | 6/1998 | Little |
| 5,774,196 A | 6/1998 | Marshall |
| 5,777,390 A | 7/1998 | Berger |
| 5,784,190 A | 7/1998 | Worley |
| 5,808,780 A | 9/1998 | McDonald |
| 5,835,256 A | 11/1998 | Huibers |
| 5,926,309 A | 7/1999 | Little |
| 5,999,306 A | 12/1999 | Atobe |
| 6,025,951 A | 2/2000 | Swart et al. |
| 6,046,840 A | 4/2000 | Huibers |
| 6,053,617 A | 4/2000 | Kaeriyama |
| 6,107,115 A | 8/2000 | Atobe et al. |
| 6,356,378 B1 | 3/2002 | Huibers |
| 6,406,148 B1 | 6/2002 | Marshall et al. |
| 6,633,212 B1 * | 10/2003 | Ruan et al. .................. 359/290 |
| 6,707,610 B1 | 3/2004 | Woodard et al. |
| 6,844,959 B2 | 1/2005 | Huibers et al. |
| 7,046,422 B2 * | 5/2006 | Kimura et al. .............. 359/295 |
| 7,141,186 B2 * | 11/2006 | Abe et al. ................. 252/520.2 |
| 2002/0146200 A1 | 10/2002 | Kudrle |
| 2005/0099669 A1 * | 5/2005 | Kowarz et al. ............. 359/291 |
| 2006/0250337 A1 * | 11/2006 | Miles .......................... 345/85 |

OTHER PUBLICATIONS

Gerhard-Multhaupt et al., "Light-Valve Projection Displays—An Introduction", Displays, vol. 16, No. 1, 1995, Elsevier Science B.V., pp. 5-7.

Gerhard-Multhaupt , "Light-Valve Technologies for High-Definition Television Projection Displays", Displays, 1991, vol. 12, No. 3/4, pp. 115-128.

Peterson, K.E., "Micromechanical Light Modulator Array Fabricated on Silicon", Applied Physics Letters, American Institute of Physics, vol. 31 No. 8, Oct. 15, 1977, pp. 521-523.

Cadman et al., "New Micromechanical Display Using Metallic Thin Films", IEEE Electron Device Letters, Jan. 1983, vol. EDL-4 No. 1, pp. 3-4.

Thomas et al., "The Mirror Matrix Tube: A Novel Light Valve for Projection Displays", IEEE Transactions on Electron Devices, vol. Ed-22 No. 9, Sep. 1975, pp. 765-775.

Hornbeck, "Digital Light Processing (TM) for High-Brightness, High Resolution Applications", Texas Instruments, Inc., date unknown, pp. 1-14.

Yoder, "The Digital Display Technology of the Future", Texas Instruments, Inc., date unknown, pp. 1-11.

Peterson, "Silicon Torsional Scanning Mirror", IBM J. Res. Develop., vol. 24 No. 5, Sep. 1980 pp. 631-637.

Bryan G. Lewis, et al., Applications and Processing of Transparent Conducting Oxides, Mrs Bulletin/Aug. 2000, pp. 22-27.

Roy G. Gordon, Criteria for Choosing Transparent Conductors, Mrs Bulleint/Aug. 2000, pp. 52-57.

* cited by examiner

OPTICAL COATING ON LIGHT TRANSMISSIVE SUBSTRATES OF MICROMIRROR DEVICES

TECHNICAL FIELD OF THE INVENTION

The present invention is related generally to the art of micromirror devices, and more particularly to micromirror devices having light transmissive substrate.

BACKGROUND OF THE INVENTION

In micromirror devices each having a light transmissive substrate, a semiconductor substrate; and a reflective deflectable mirror plate disposed therebetween, incident light to be modulated by the mirror plate travels through the light transmissive substrate and impinges the reflective surface of the mirror plate. The mirror plate switches between the ON and OFF state so as to reflect the incident light into different spatial directions. During switching, the mirror plate may contact the surface of the light transmissive, resulting in electrical short when the light transmissive substrate comprises electrode.

Therefore, what is needed is a method and apparatus to electrically isolating the mirror plate from the light transmissive substrate.

SUMMARY OF THE INVENTION

In view of the foregoing, the present invention discloses a light optical coating on the light transmissive substrate of micromirror devices. Such optical coating is electrically insulating, but optically transmissive to the incident light such that, electrical short between the deflectable mirror plate and electrode on the light transmissive substrate can be avoided, while the incident light is still able to travel through the light transmissive substrate and impinge the reflecting surface of the mirror plate.

In one example, the optical coating comprises a titanium dioxide layer, first silicon dioxide layer, an indium-titanium-oxide (ITO) layer, and second silicon dioxide layer.

In another example, the optical coating comprises a niobium dioxide layer, first silicon dioxide layer, an indium-titanium-oxide (ITO) layer, and second silicon dioxide layer.

The objects of the invention are achieved in the features of the independent claims attached hereto. Preferred embodiments are characterized in the dependent claims.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

In view of forgoing, the present invention provides a micromirror device that comprises a light transmissive substrate having a light transmissive optical coating formed thereon. The optical coating comprises an electrical conducting layer and an electrical insulating layer. All layers of the optical coating are transmissive to the incident light.

Figure 1:
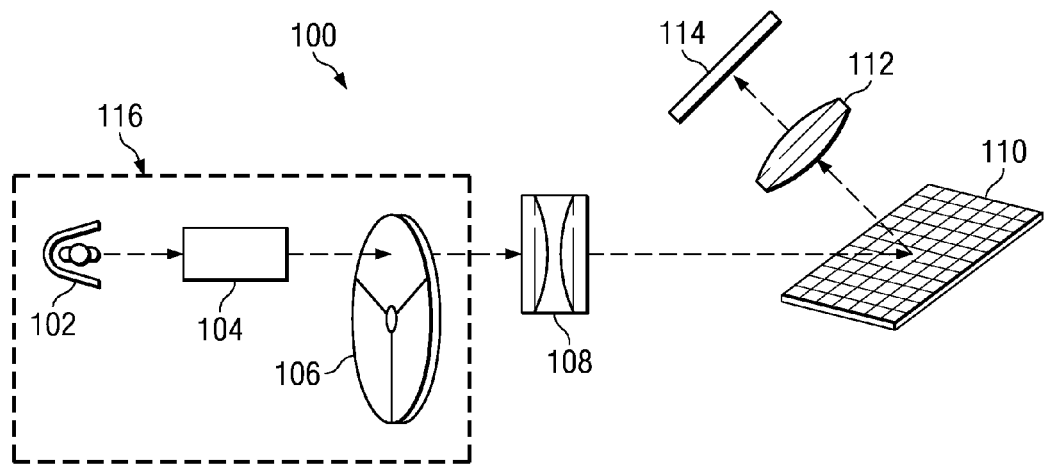
FIG. 1 illustrates an exemplary display system employing a spatial light modulator having an array of micromirrors in which embodiments of the invention can be implemented.

Turning to the drawings, FIG. 1 illustrates an exemplary digital display system employing a spatial light modulating having an array of micromirrors in which embodiment of the invention can be implemented. Referring to FIG. 1, display system 100 comprises illumination system 116 for producing sequential color light, spatial light modulator 110 that comprises an array of micromirrors, optical element 108 for directing illumination light from the illumination system onto the spatial light modulator, and optical element 112 that projects the reflected illumination light onto display target 114.

Illumination system 116 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure.

Figure 2:
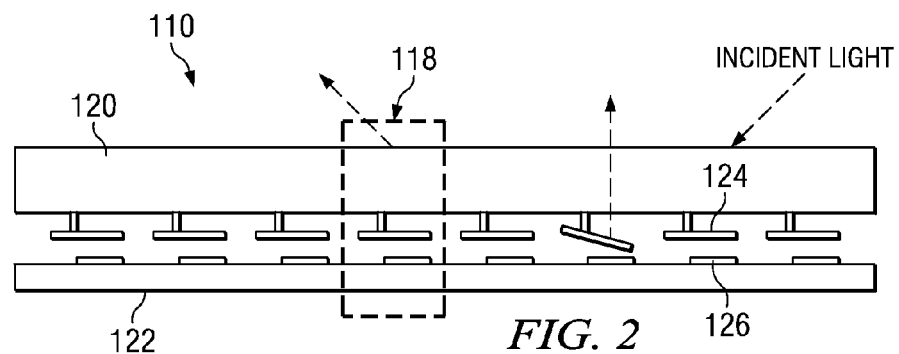
FIG. 2 illustrates a cross-section of a portion of the spatial light modulator in FIG. 1.

FIG. 2 illustrates a cross-section view of an exemplary spatial light modulator in FIG. 1. For simplicity purposes, only eight micromirror devices are illustrated therein. In general, the micromirror array of a spatial light modulator consists of thousands or millions of micromirrors, the total number of which determines the resolution of the displayed images. For example, the micromirror array of the spatial light modulator may have 1024×768, 1280×720, 1400× 1050, 1600×1200, 1920×1080, or even larger number of micromirrors. In other applications, the micromirror array may have less number of micromirrors.

In this example, the array of deflectable reflective mirror plates (e.g. 124) is disposed between light transmissive substrate 120 and semiconductor substrate 122 having formed thereon an array of addressing electrodes (e.g. addressing electrode 126) each of which is associated with a mirror plate for electrostatically deflecting the mirror plate. In operation, the illumination light passes through the light transmissive substrate and illuminates the reflective surfaces of the mirror plates, from which the illumination light is modulated. The reflected illumination light from the mirror plates at the ON state is collected by the projection lens (e.g. projection lens 112 in FIG. 1) so as to generate a "bright" pixel in the display target (e.g. display target 114 in FIG. 1). The reflected illumination from the mirror plates at the OFF state travels away from the projection lens, resulting in the corresponding pixels in the display target to be "dark."

The micromirrors in the array can be arranged in many suitable ways. For example, the micromirrors can be arranged such that the center-to-center distance between the adjacent mirror plates can be 10.16 microns or less, such as 4.38 to 10.16 microns. The nearest distance between the edges of the mirror plate can be from 0.1 to 1.5 microns, such as from 0.15 to 0.45 micron, as set forth in U.S. patent applications Ser. No. 10/627,302 (now U.S. Pat. No. 6,965,468 issued Nov. 15, 2005), Ser. No. 10/627,155 (now U.S. Pat. 7,019,376 issued Mar. 28, 2006, and Ser. No. 10/627,303 (now U.S. Pat. No. 6,980,347 issued Dec. 27, 2005), both to Patel, filed Jul. 24, 2003, the subject matter of each being incorporated herein by reference.

Figure 3:
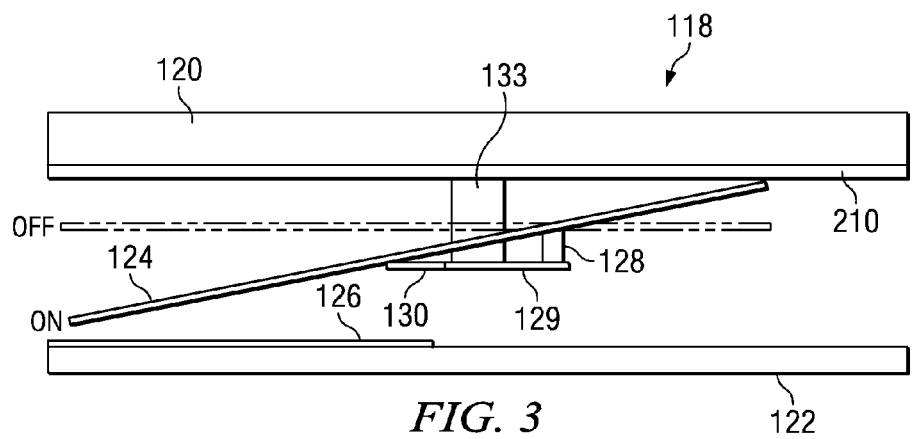
FIG. 3 illustrates an exploded cross-section view of a micromirror device in FIG. 2.

As a way of example, an exemplary micromirror in FIG. 2 is schematically illustrated in a cross-section view in FIG. 3. Referring to FIG. 3, micromirror 118 comprises deflectable mirror plate 124 having a reflective surface for reflecting the illumination light to be modulated. The mirror plate is attached to deformable hinge 129 (e.g. a torsion hinge) via hinge contact 128 with the deformable hinge being held and supported by post 133 on substrate 120 such that the mirror plate can be deflected (rotated) relative to the substrate. The deflection of the mirror plate is achieved by electrostatic field established between the mirror plate and addressing electrode 126.

According to the invention, the light transmissive substrate 120 comprises an electrode (e.g. electrode 210) for pulling the mirror plate towards the light transmissive substrate. This electrode on the light transmissive substrate is transmissive to the incident light. Specifically, the electrode transmits 90% or more, or 99% or more of the incident light (e.g. visible light). The electrode can be formed as a film, a strip, a grid, or a set of discontinuous segments, as set forth in U.S. patent application Ser. No. 10/437,776 (now U.S. Pat. No. 7,099,065 issued Aug. 29, 2006) filed May 13, 2003, and Ser. No. 10/947,005 (now U.S. Pat. No. 7,113,322 issued Sep. 26, 2006) filed Sep. 21, 2004, the subject matter of each being incorporated herein by reference in entirety.

In accordance with an embodiment of the invention, only one addressing electrode 126 is provided for the micromirror for switching the mirror plate between the ON and OFF state according to the image data of the desired image to be produced by the system. Of course, multiple addressing electrodes can be provided for each micromirror, which will not be discussed in detail herein.

Stopper 130 can be provided as an alternative feature to limit the rotation of the mirror plate in accordance with the operation states, such as the ON state when the micromirror is operated in a binary mode including the ON and OFF state. The stopper 130 can be formed in many alternative ways, such as those set forth in U.S. patent applications Ser. No. 10/437,776 filed Apr. 13, 2003 (now U.S. Pat. No. 7,099,065 issued Aug. 20, 2006) and Ser. No. 10/613,379 filed Jul. 3, 2003 (now U.S. Pat. No. 6,873,450 issued Mar. 29, 2005), Ser. No. 10/703,678 filed Nov. 7, 2003 (now U.S. Pat. No. 6,876,485 issued Apr. 5, 2005), the subject matter of each being incorporated herein by reference In operation, the mirror plate switches between the ON and OFF state according to the image data so as to reflect the incident light into different directions. As an example, the mirror plate is rotated to the ON state by setting the electrical voltage on the addressing electrode 126 to a value such that the rotation torque derived from the voltage difference between the mirror plate and the addressing electrode is sufficient enough to overcome the total resisting torque including the mechanical torque in the deformable hinge and the electrical torque derived from the voltage difference between the mirror plate and the electrode 210 on the light transmissive substrate. When the voltage difference between the mirror plate and addressing electrode is removed, or reduced to a value that can not balance the total resisting torque including the mechanical torque of the deformed hinge and the electrical torque derived from the voltage difference between the mirror plate and electrode 210 on the light transmissive substrate, the mirror plate rotates towards the OFF state.

At the ON state, or a state wherein the mirror plate is forced to rotate further than the ON state, the mirror plate, especially the end moving towards the light transmissive substrate when the mirror plate rotates towards the ON state, may contact the electrode 210 on the light transmissive substrate, causing electrical short. In order to avoid such electrical short, the electrode 210 on the light transmissive substrate can be covered by an optical coating, as illustrated in FIG. 4.

Figure 4:
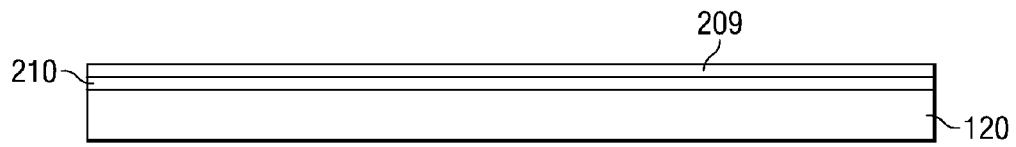
FIG. 4 illustrates an exploded cross-section view of the light transmissive substrate having an optical coating thereon in FIG. 3.

Referring to FIG. 4, light transmissive substrate 120 comprises electrode 210 formed thereon. An electrical insulating layer 209 is deposited on the electrode layer 210 by laminating the electrode layer 210 between the electrical insulating layer 209 and the surface of the light transmissive substrate 120. The electrical conducting layer 209 is electrically insulating, preferably having a resistivity of $5 \times 10^9$ ohm/cm$^2$ or higher. For allowing the transmission of the incident light therethrough, the electrical insulating layer 209 comprises a material that transmits 90% or more, such as 95% or more, or 99% or more of the incident light. The electrical insulating layer may be deposited to cover the entire surface of the electrode 210. Alternatively, the electrical insulating layer can be configured and deposited in any suitable ways as long as the contacting area of the mirror plate to the surface of the light transmissive substrate is covered by the electrical insulating patch and insulated thereby. Specifically, the electrical insulating layer can be shaped independently from the shape of the electrode, especially when other constraints need to be balanced or satisfied.

The electrically conductive and electrically insulating layers (209 and 210) can be any suitable materials that are transparent at the thickness at which they are provided on the light transmissive substrate. Preferably, though not necessary, this will be an oxide compound.

For example, the electrically conductive layers may comprise metalloid, metal alloys that comprise two or more elemental metals, intermetallic compounds, and ceramics, organics, and polymers. The intermetallic compound may be composed of a transition metal, including early and late transition metals.

A ceramic is a compound wherein a metal (or metalloid) is bonded to a non-metal. The ceramics for the light transmissive and electrically conductive layers can be oxides, nitrides or carbides of metals or metalloids, preferably a metal oxide or metalloid oxide binary or ternary compound.

For example, the transparent and electrically conductive layer may comprise: indium-titanate-oxide, $TiO_x$, doped $ZnO_x$ (such as $ZnO_x$ doped with aluminum, gallium, fluorine, boron, and indium), $SnO_2$, doped $SnO_2$ (such as $SnO_2$ doped with fluorine and antimony), $GdIn_xO_y$, doped $InO_x$ (such $InO_x$ doped with fluorine, tin and other suitable conductive organics and polymers, such as Baytron® conductive polymers (e.g. Baytron R)). Other transparent and conductive materials may also be used, such as $CdSn_xO_y$ (e.g. $Cd_2SnO_4$, $CdSnO_3$ and $CdIn_2O_4$), $An_2SnO_4$, $MgIn_2O_4$, Y doped $CdSb_2O_3$, $ZnSnO_3$, $GaINO_3$, $Zn_2In_2O_5$, and $In_4Sn_3O_{12}$, indium doped CdO, $CuAlO_2$, $Cu_2SrO_2$, and $CuGaO_2$ do $Ti_2O_3$, $PbO_2$, $Sb_2O_5$.

The electrically insulating materials can be materials of high optical indices or materials of low optical indices. For example, the transparent and electrically insulating material with high optical indices can be $TiO_x$ and $Nb_2O_5$, $HfO_2$, $Ta_2O_5$, $ZrO_2$, $Si_3N_4$, $La_2O_3$, and $Nd_2O_3$. The transparent and electrically insulating materials with low optical indices can be $CaF_2$, $SiO_2$, $MgF_2$, and $Al_2O_3$. Of course, the materials listed above are for demonstration purposes, and is not intend to include all possible transparent and electrically conductive (or insulating) materials that are applicable in the present invention.

In selecting and applying the transparent and electrically conductive and insulating materials to the light transmissive substrate (e.g. substrate 120), the electrically conductive (and/or insulating) layers can themselves be a single or multilayered structures to improve the anti-reflection properties of the layers. Alternatively, the electrically conductive and insulating layers can be alternatively stacked on the light transmissive substrate. For example, a material of high optical index can be stacked closer to the light transmissive substrate than those materials of low optical indices so as to form an optical index gradient from the surface of the light transmissive substrate to the air, which in turn improves the anti-reflection of the incident light.

In selecting and forming the materials on the light transmissive substrate, other factors may also be included for consideration, such as the compatibility of the Coefficient-of-Thermo Expansion (CTE) and adhesive abilities to the light transmissive substrates, which will not be discussed in detail herein.

Figure 5:
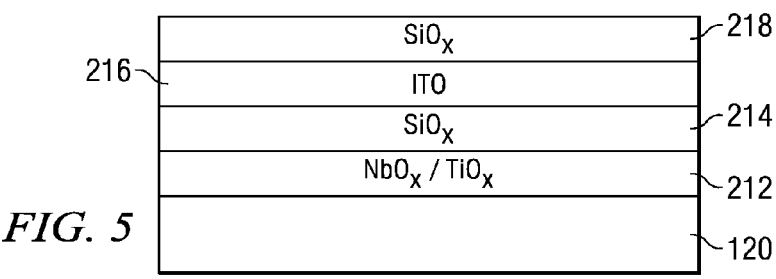
FIG. 5 illustrates an exploded cross-section view of an exemplar optical coating on the light transmissive substrate of FIG. 4.

Referring to FIG. 5, an exemplary laminated electrode-electrical insulating structure on the light transmissive substrate of the micromirror device is illustrated therein. The laminate comprises niobium oxide layer 212, silicon oxide layer 214, indium-titanium-oxide layer 216, and another silicon oxide layer 218. These films can be formed using any suitable film fabrication methods, such as chemical-vapor-deposition (CVD), physical-vapor-deposition (PVD), and physical-electro-chemical-vapor phase deposition (PECVD). As a numerical example, the niobium oxide layer may have a thickness of from 10 angstroms to 5000 angstroms, preferably from 50 angstroms to 200 angstroms, and more preferably around 100 angstroms. The optical index of this niobium oxide layer is preferably from 1 to 2.7, more preferably from 1.5 to 2.5, and more preferably around 2.3. The first silicon oxide layer may have a thickness of from 10 angstroms to 5000 angstroms, preferably from 50 angstroms to 500 angstroms, and more preferably around 400 angstroms. The optical index of this silicon oxide layer is preferably from 1 to 1.7, more preferably from 1.2 to 1.5, and more preferably around 1.46. The indium-titanium-oxide layer may have a thickness of from 10 angstroms to 5000 angstroms, preferably from 50 angstroms to 1000 angstroms, and more preferably around 600 angstroms. The optical index of this silicon oxide layer is preferably from 1 to 2.7, more preferably from 1.2 to 1.9, and more preferably around 1.8. The second silicon oxide layer may have a thickness of from 10 angstroms to 5000 angstroms, preferably from 50 angstroms to 1500 angstroms, and more preferably around 900 angstroms. The optical index of this silicon oxide layer is preferably from 1 to 1.7, more preferably from 1.2 to 1.5, and more preferably around 1.46.

The laminate may also comprise a titanium oxide layer, a silicon oxide layer, an indium-titanate-oxide layer, and another silicon oxide layer. These films can be formed using any suitable film fabrication methods, such as chemical-vapor-deposition (CVD), physical-vapor-deposition (PVD), and physical-electro-chemical-vapor phase deposition (PECVD). As a numerical example, the titanium oxide layer may have a thickness of from 10 angstroms to 5000 angstroms, preferably from 50 angstroms to 200 angstroms, and more preferably around 100 angstroms. The optical index of this titanium oxide layer is preferably from 1 to 2.7, more preferably from 1.5 to 2.5, and more preferably around 2.4. The first silicon oxide layer may have a thickness of from 10 angstroms to 5000 angstroms, preferably from 50 angstroms to 500 angstroms, and more preferably around 400 angstroms. The optical index of this silicon oxide layer is preferably from 1 to 1.7, more preferably from 1.2 to 1.5, and more preferably around 1.46. The indium-titanium-oxide layer may have a thickness of from 10 angstroms to 5000 angstroms, preferably from 50 angstroms to 1000 angstroms, and more preferably around 600 angstroms. The optical index of this silicon oxide layer is preferably from 1 to 2.7, more preferably from 1.2 to 1.9, and more preferably around 1.8. The second silicon oxide layer may have a thickness of from 10 angstroms to 5000 angstroms, preferably from 50 angstroms to 1500 angstroms, and more preferably around 900 angstroms. The optical index of this silicon oxide layer is preferably from 1 to 1.7, more preferably from 1.2 to 1.5, and more preferably around 1.46.

In operation, the electrical conductive layer, such as the indium-titanate-oxide layer is connected to an external power source for electrostatically deflecting the mirror plates in the direction towards the light transmissive substrate. The electrical potential of the electrically conductive and light transmissive layer may vary over time during operation for many purposes, such as inversing the polarity of the voltages so as to eliminating unexpected charge accumulation, as set forth in U.S. patent application Ser. No. 10/607,687 filed Jun. 27, 2003, the subject matter being incorporated herein by reference in entirety. For this purpose, the electrical and non-electrical conductive layers are patterned as appropriate. As a way of example, FIG. 6a illustrates in a top view of an exemplary configuration of the transparent layers on the light transmissive substrate.

Figure 6A:
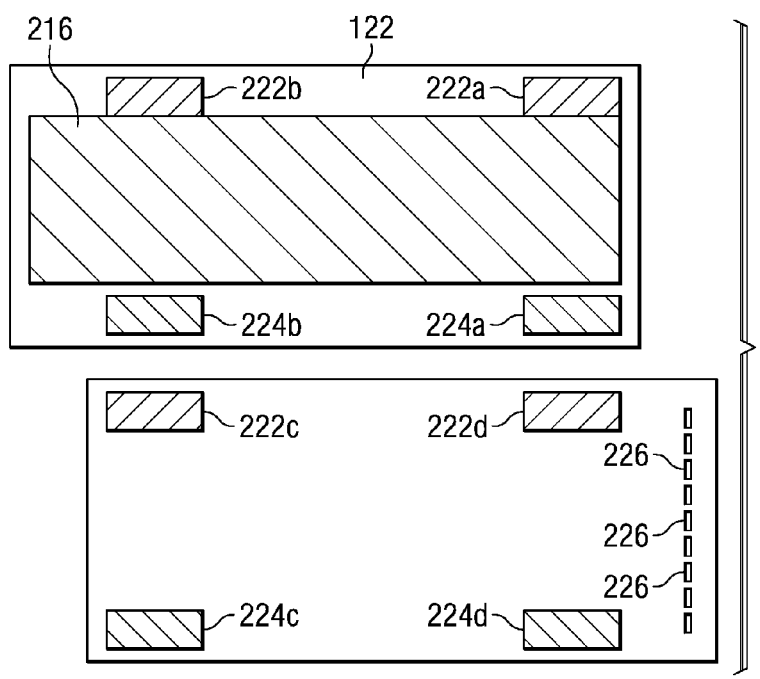
FIG. 6a illustrates a top view of the optical coating on the light transmissive substrate in FIG. 5, and a top view of a plurality of electrical contacting pads on another substrate when the device comprises multiple substrates.

Referring to FIG. 6a, electrically conductive and light transparent layer, indium-titanate-oxide layer 216, is deposited and patterned on light transmissive substrate 122. For simplicity and demonstration purposes, only layer 216 is illustrated. Other layers, such as layers 212, 214, and 218 in FIG. 5 are removed from the figure. The light transparent and electrically conductive layer 126 is patterned to have electrical contacting pads 222a and 222b, wherein each pad is exposed (e.g. not covered by any other electrically insulating materials). In this example, the electrically conductive layer (layer 126) is configured to have two separate contacting pads. In other examples, each electrically conductive and light transmissive layer may be configured to have any suitable number of electric contacting pads. Also shown in the figure are other electrically conducting pads 224a and 224b for providing electrical contacts to other functional members, such as the reflective and deflectable mirror plates when an array of deflectable reflective mirror plates of a micromirror array device is formed on the light transmissive substrate 122. Exemplary such micromirrors are shown in FIGS. 7 to 16, which will be discussed afterwards.

In an instance when the functional members of the device are formed on separate substrates, the electric contacting pads can be extended to the other substrate of the device, as shown in the figure. Specifically, a group of functional members (e.g. an array of reflective deflectable mirror plates) is formed on light transmissive substrate 122, and another group of functional members (e.g. an array of addressing electrodes associated with the array of mirror plates) is formed on substrate 190 that can be a standard semiconductor substrate. Electric contacting pads 222c and 222d, (as well as 224c and 224d if 224a and 224b are formed on substrate 122) are formed at locations such that when the two substrates are aligned or assembled together, electrical contacting pads 222a and 222d can be directly contacted, so are electric contact pads 222b and 222c. In this way, electrical contacts to pads 222a and 222b, that is to the electrical conductive and light transmissive layer 216 on substrate 122 can be extended to substrate 190 via pads 222c and 222d on substrate 190. The electrical contacts to pads 222c and 222d can be further extended to pads 226 deployed on a surface of substrate 190 that are easy to be managed and handled during installation and operation.

Figure 6B:
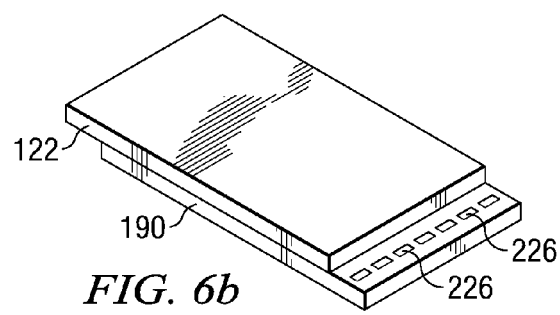
FIG. 6b illustrates a device assembly after then substrates in FIG. 6a are bonded and assembled.

The assembled device having substrates 120 and 190 in FIG. 6a is illustrated in FIG. 6b. It can be seen in the figure that the delicate electric contacting pads 222a, 222b, 224a, and 224b on substrate 120, and pads 222c, 222d, 224c, and 224d on substrate 190, are securely enclosed with the cell between substrates 120 and 190. Electrical contacting pads 226 are exposed outside the cell such that external signals and power sources can then be connected to pads 226, as set forth in U.S. patent application Ser. No. 11/102,082, "Electrical Contacts in Micro-electromechanical Devices with Multiple Substrates", filed on the same day as the present patent application, the subject matter being incorporated herein by reference.

The present invention is applicable to many types of micromirrors. Specifically, the light transparent and electrically conductive layer can be formed on a light transmissive substrate that is a part of or is connected to a micromirror array device. Such transparent and electrically conductive layer can be used as an electrode for pulling the reflective deflectable mirror plates towards the light transmissive substrate. FIG. 3 illustrates one of the many examples. Referring again to FIG. 3, the mirror plate can be attached to the deformable hinge symmetrically or asymmetrically. When the mirror plate is attached to the deformable hinge with the attachment point substantially at or around the geometric (or mass) center of the mirror plate, the mirror plate rotates symmetrically—that is, the maximum angles achievable by the mirror plate rotating in opposite directions are substantially the same. Alternatively, when the attachment point is offset from the geometric (or mass) center of the mirror plate, the mirror plate rotates asymmetrically— that is the maximum angles achievable by the mirror plate in opposite directions are different. The asymmetric rotation of the mirror plate is more advantageous in obtaining higher contrast ratio. The ON state angle of the present invention is preferably 12° degrees or more, such as 14° degrees or more, and 14° degrees or more. The OFF state can be a state where the mirror plate is parallel to the substrate on which the mirror plates are formed, such as substrate 120. The OFF state angle can be other values, such as −1° degree or less, such as −2° degrees or less, and −4° degrees or less, wherein the minus sign "−" represents the opposite rotation direction in relation to the ON state angle. Such ON and OFF state angles can be achieved by attaching the mirror plate asymmetrically to the deformable hinge. Specifically, the hinge contact (128) contacts at the mirror plate at a location away from the geometric or mass center of the mirror plate. As a result, the deformable hinge, as well as the rotation axis is not along a diagonal of a diagonal of the mirror plate when viewed from the top of the mirror plate at the non-deflected state. Exemplary micromirrors of asymmetric rotation will be better illustrated in perspective views in FIGS. 7 to 10 afterwards.

In the cross-section view of FIG. 3, the deformable hinge and the mirror plate are in different planes. Alternatively, the mirror plate and the deformable hinge can be in the same plane. For example, the mirror plate and the deformable hinge can be fabricated or derived from a single flat substrate, such as a single crystal (e.g. single crystal silicon). Alternatively, the mirror plate and the deformable hinge can be derived from one deposited film by patterning. The stopper (e.g. stopper 130) can be in the same plane of the deformable hinge, but can also be in different planes of the deformable hinge.

In addition to the addressing electrode whose operation state (voltage) depends upon the image data of the desired image, an additional electrode for rotating the mirror plate in the direction opposite to that driven by the addressing electrode can also be provided. For example, the additional electrode can be formed on substrate 120 on which the mirror plate is formed. Alternatively, the additional electrode can be formed on the micromirror on a side opposite to the addressing electrode relative to the rotation axis of the mirror plate.

In the example as shown in FIG. 3, the deflectable mirror plates are formed on substrate 120 that is transmissive to the illumination light to be modulated, such as glass and quartz when the illumination light is visible light. The addressing electrodes and circuitry are formed on substrate 122 that can be a standard semiconductor substrate. In another embodiment of the invention, the mirror plates can be directly derived from the light transmissive substrate, such as by patterning the light transmissive substrate so as to form the deflectable mirror plate. In this instance, the deformable hinge can be single crystal or deposited thin film, which will not be discussed in detail herein. As another example, the mirror plates and the addressing electrodes can be formed on the same substrate, such as semiconductor substrate 122.

Addressing electrode 126 is preferably disposed such that the edge of the addressing electrode extending beyond the mirror plate, for example, beyond the furthest point of the mirror plate measured from the deformable hinge, so as to maximize the utilization efficiency of the electrostatic field, as set forth in U.S. patent application Ser. No. 10/947,005 filed Sep. 21, 2004 (now U.S. Pat. No. 7,113,322 issued Sep. 26, 2006, the subject matter being incorporated herein by reference. In an embodiment of the invention, each mirror plate is addressed and deflected by one single addressing electrode. In this instance, the mirror plate is rotated to the ON state by an electrostatic force derived from the electrostatic field established between the mirror plate and the addressing electrode.

Figure 7:
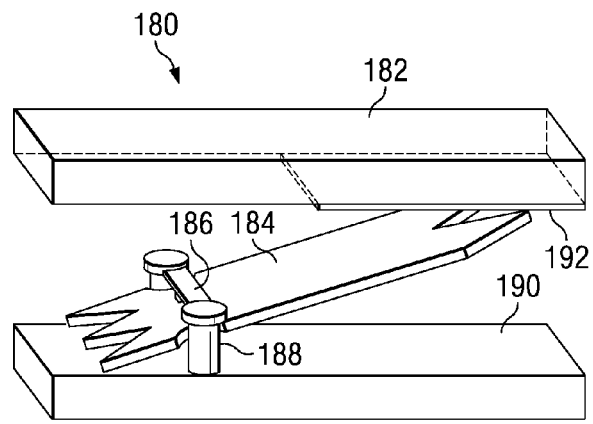
FIG. 7 is a perspective view of an exemplary micromirror device useable in the spatial light modulator of FIG. 1.

Referring to FIG. 7, a perspective view of an exemplary micromirror device in which embodiments of the invention are applicable is illustrated therein. Micromirror device 180 comprises substrate 190 that is a light transmissive substrate such as glass or quartz and semiconductor substrate 182. Deflectable and reflective mirror plate 184 is spaced apart and attached to deformable hinge 186 via a hinge contact. The deformable hinge is affixed to and held by posts 188. The semiconductor substrate has addressing electrode 192 for deflecting the mirror plate. In this particular example, the light transmissive substrate operates as a stopper for stopping the rotation of the mirror plate at the ON state.

Figure 8:
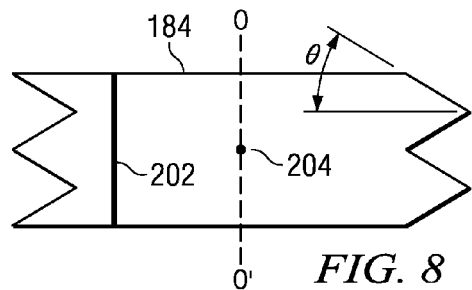
FIG. 8 schematically illustrates a top view of the deflectable mirror plate of the micromirror device of FIG. 6.

A top view of the micromirror in FIG. 7 is illustrated in FIG. 8. As can be seen in FIG. 8, deformable hinge 186 is not along but offset from the symmetrical axis OO' of the mirror plate such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into zigzagged shape, as shown in the figure.

The deflectable and reflective minor plate can be a multilayered structure. For example, the mirror plate may comprise an electrical conducting layer, a reflective layer that is capable of reflecting 85% or more, or 90% or more, or 99% or more of the incident light (e.g. incident visible light), a mechanical enhancing layer that enhances the mechanical properties of the mirror plate. For example, the mirror plate may comprise a $SiO_2$ layer, an aluminum layer, a titanium layer, and a titanium nitride layer. When the aluminum layer is to be deposited on the $SiO_2$ layer, diffusion between the aluminum layer and $SiO_x$ layer may occur. This can be avoided by depositing a barrier layer therebetween.

Figure 9:
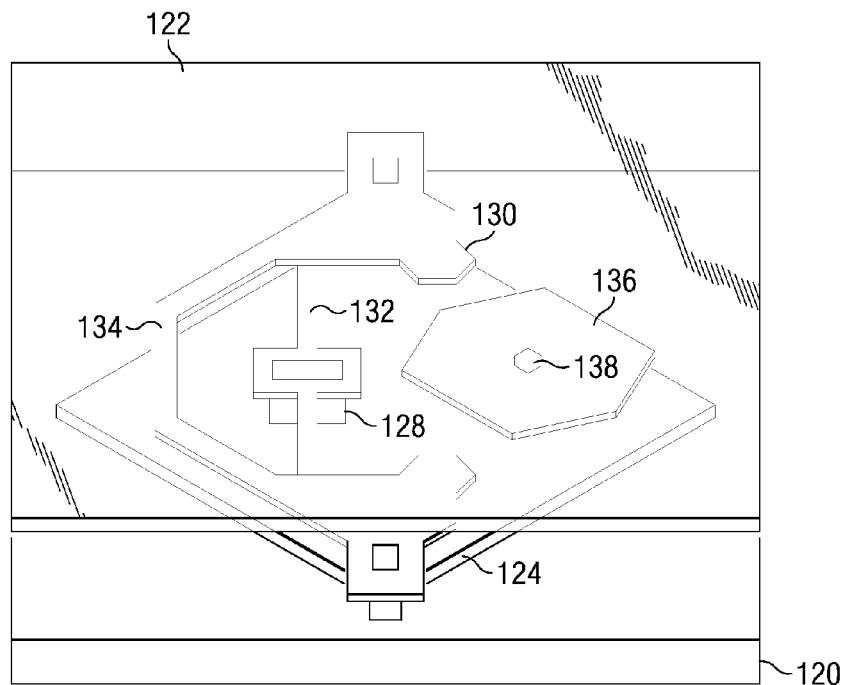
FIG. 9 is a perspective view of another exemplary micromirror device useable in the spatial light modulator of FIG. 1.

Another exemplary micromirror device having a cross-sectional view of FIG. 3 is illustrated in its perspective view in FIG. 9. Referring to FIG. 9, deflectable reflective mirror plate 124 with a substantially square shape is formed on light transmissive substrate 120, and is attached to deformable hinge 132 via hinge contact 128. The deformable hinge is held by hinge support 134, and the hinge support is affixed and held by posts on the light transmissive substrate. For electrostatically deflecting the mirror plate, an addressing electrode (not shown in the figure for simplicity purposes) is fabricated in the semiconductor substrate 122. For improving the electrical coupling of the deflectable mirror plate to the electrostatic field, extending metallic plate 136 can be formed on the mirror plate and contacted to the mirror plate via post 138.

Figure 10:
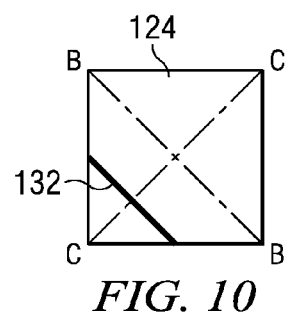
FIG. 10 schematically illustrates a top view of the deflectable mirror plate of the micromirror device of FIG. 8.

The mirror plate is preferably attached to the deformable hinge asymmetrically such that the mirror plate can be rotated asymmetrically in favor of high contrast ratio. The asymmetric attachment is better illustrated in FIG. 10. Referring to FIG. 10, mirror plate comprises diagonals BB and CC. Deformable hinge is disposed with its length parallel to a diagonal (e.g. BB) of the mirror plate. However, the length of the deformable is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that in FIG. 7, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 11:
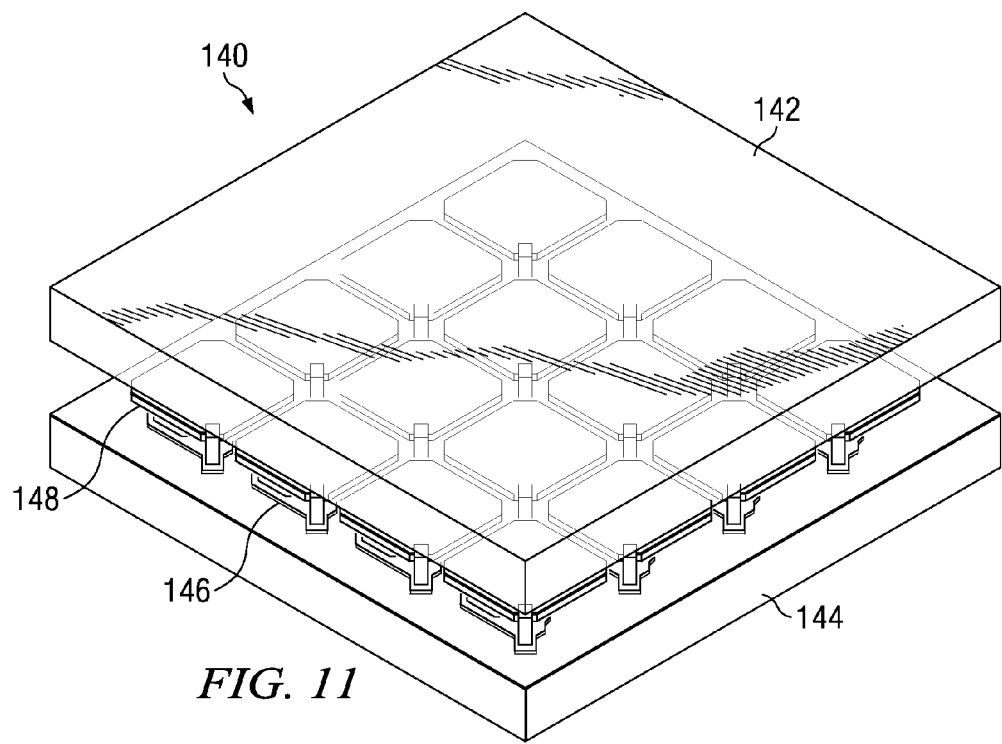
FIG. 11 is a perspective view of an exemplary spatial light modulator of FIG. 1.

Referring to FIG. 11, an exemplary spatial light modulator having an array of micromirrors of FIG. 9 is illustrated therein. For simplicity purposes, only 4×4 micromirrors are presented. In this example, micromirror array 148 is formed on light transmissive substrate 142; and addressing electrode and circuitry array 146 is formed on semiconductor substrate 144 for deflecting the micromirrors in the micromirror array. The deformable hinges of the micromirrors, as well as the addressing electrodes are hidden from the incident light.

Figure 12:
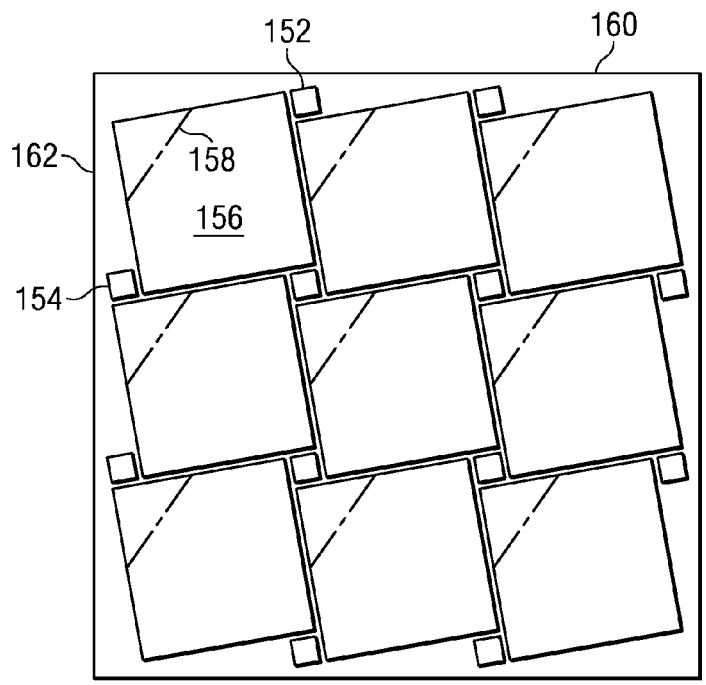
FIG. 12 is a top view of another exemplary spatial light modulator of FIG. 1.

The micromirrors in the micromirror array of the spatial light modulator can be arranged in alternative ways, another one of which is illustrated in FIG. 12. Referring to FIG. 12, each micromirror is rotated around its geometric center an angle less than 45° degrees. The posts (e.g. 152 and 154) of each micromirror (e.g. mirror 156) are then aligned to the opposite edges of the mirror plate. No edges of the mirror plate are parallel to an edge (e.g. edges 160 or 162) of the micromirror array. The rotation axis (e.g. axis 158) of each mirror plate is parallel to but offset from a diagonal of the mirror plate when viewed from the top of the mirror plate at a non-deflected state.

Figure 13:
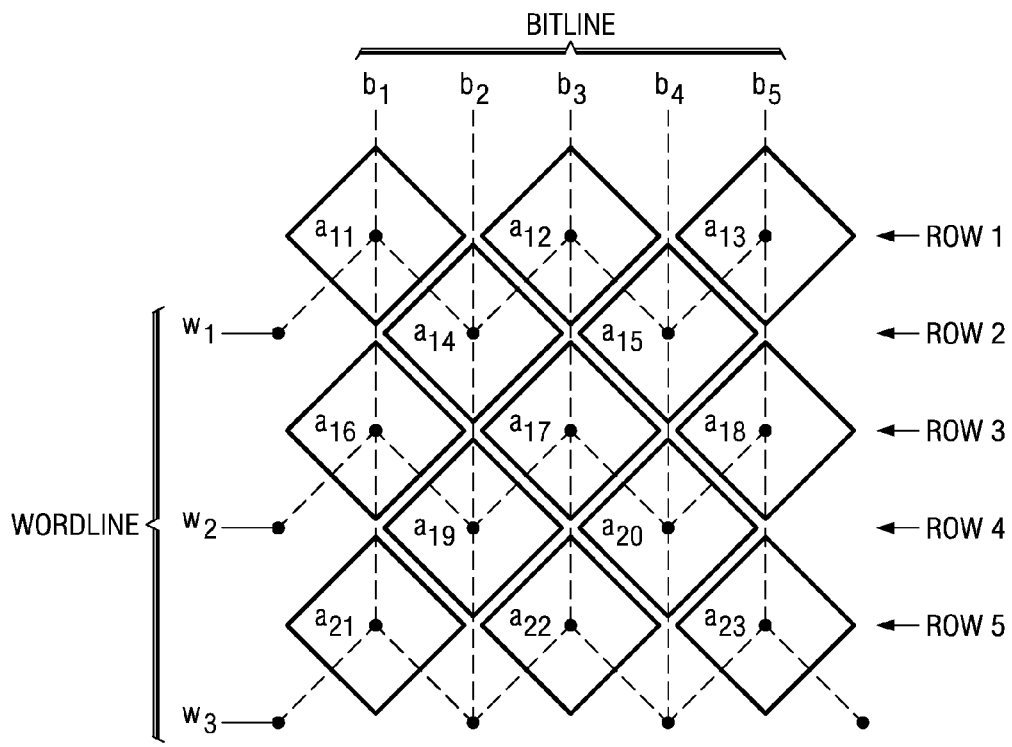
FIG. 13 schematically shows a top view of another exemplary micromirror array.

FIG. 13 illustrates the top view of another micromirror array having an array of micromirrors of FIG. 7. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 14:
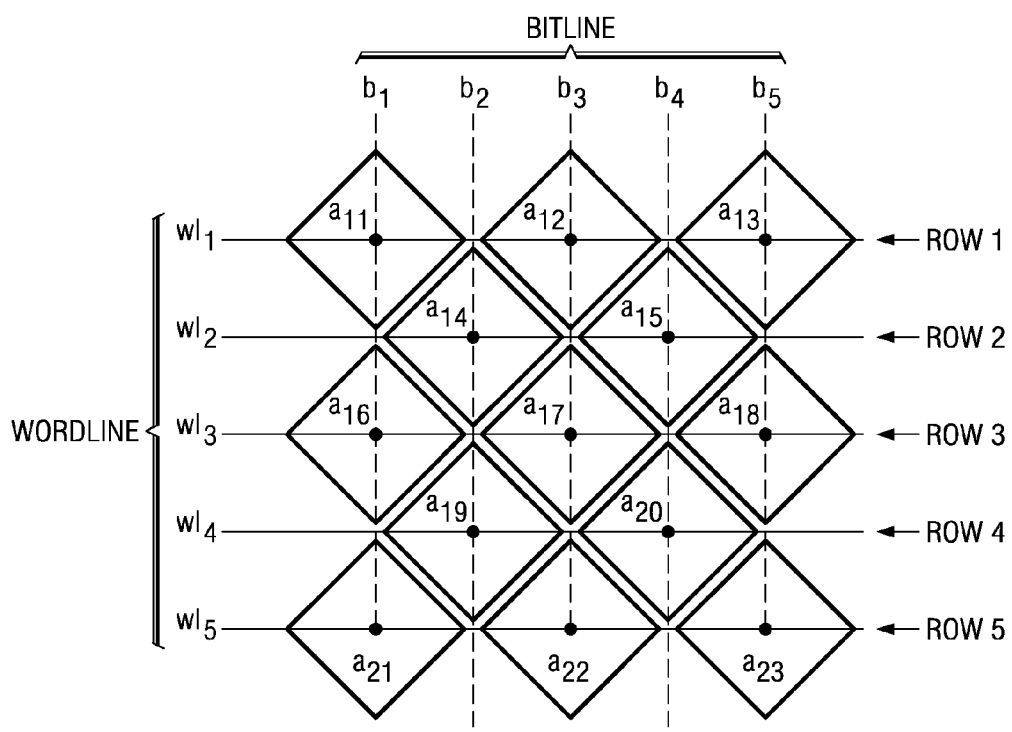
FIG. 14 schematically shows a top view of yet another exemplary micromirror array.

For the same micromirror array, the bitlines and wordlines can be deployed in other ways, such as that shown in FIG. 14. Referring to FIG. 14, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 15A:
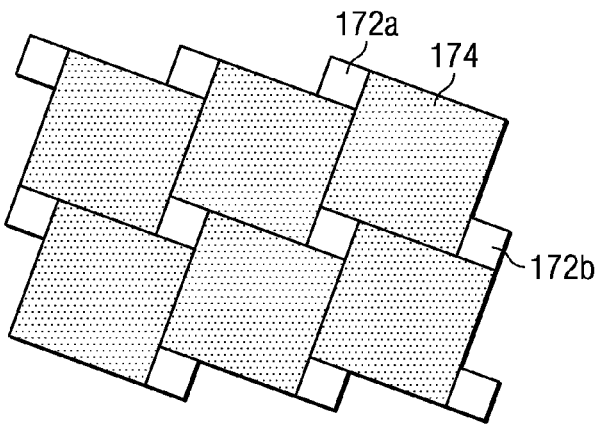
FIGS. 15a to 16 schematically show a top view of another exemplary micromirror array device comprising an array of electrodes and circuitry and micromirrors.
Figure 15B:
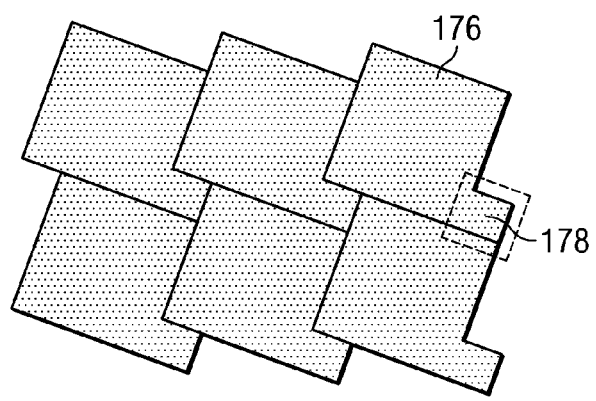
Figure 16:
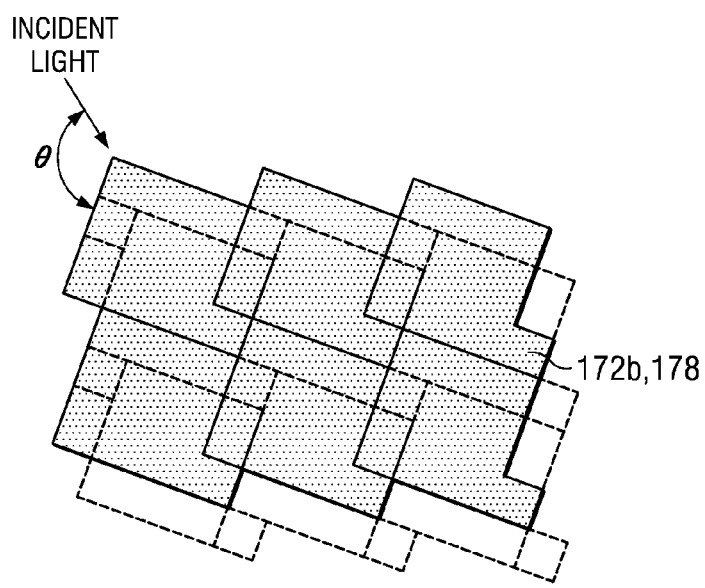

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 15a to 16.

Referring to FIG. 15a, a portion of an array of mirror plates of the micromirrors is illustrated therein. The mirror plates in the array form a plurality of pockets in between. For example, pockets 172a and 172b are formed in which posts for supporting and holding mirror plate 174 can be formed. For individually addressing and deflecting the mirror plates in FIG. 15a, an array of addressing electrodes is provided, a portion of which is illustrated in FIG. 15b.

Referring to FIG. 15b, each addressing electrode has an extended portion, such as extended portion 178 of addressing electrode 176. Without the extended portion, the addressing electrode can be generally square, but having an area equal to or smaller than the mirror plate.

FIG. 16 illustrates a top view of a micromirror array device after the addressing electrodes in FIG. 15b and the mirror plates in FIG. 15a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system as shown in FIG. 1, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

The micromirrors in which embodiments of the invention can be implemented may be composed of any suitable materials and fabricated in many ways. According to the invention, the deflectable mirror plate comprises reflective film, preferably composed of a metallic material (e.g. aluminum, gold, silver) having a high reflectivity, deposited on another non-metallic material, such as $SiO_x$, $SiN_x$ and $TiN_x$ for enhancing the mechanical properties of the mirror plate. Alternatively, other materials, such as a barrier layer for preventing diffusion between the metallic reflecting layer and the mechanical enhancing layer, can be deposited between the metallic reflecting layer and the mechanical enhancing layer.

The deformable hinge preferably comprises an electrically conductive layer. Examples of suitable materials for the hinge layer are Al, Ir, titanium, titanium nitride, titanium oxide(s), titanium carbide, $TiSiN_x$, $TaSiN_x$, or other ternary and higher compounds.

It will be appreciated by those skilled in the art that a new and useful method and apparatus for transposing pixel data matrices into bitplane data matrices for use in display systems having micromirror arrays have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. A micromirror array device, comprising:
   a first and second substrates bonded together so as to form a gap therebetween;
   an array of deflectable reflective mirror plates disposed within the gap;
   an addressing electrode on the second substrate for deflecting the mirror plate towards the second substrate; and
   a light transmissive laminate on the first substrate for rotating the mirror plate towards the first substrate, wherein said light transmissive laminate comprises an electrically conductive thin film layer and an electrically insulating thin film layer.

2. The device of claim 1, wherein the light transmissive laminate is connected to an external power source for rotating the mirror plates towards the first substrate.

3. The device of claim 1, wherein the electrically conductive thin film comprises a material that is selected from the group consisting of a nitride, and a carbide of a metal and metalloids.

4. The device of claim 2, wherein the electrically conducting layer comprises an indium-titanate-oxide.

5. The device of claim 4, wherein the electrically insulating layer comprises silicon oxide.

6. The device of claim 5, wherein the insulating layer of the transparent laminate is a first dielectric layer; and wherein the transparent laminate further comprises a second dielectric layer that is transmissive to visible light.

7. The device of claim 6, wherein the first and second dielectric layers and the electrically conductive layer are alternatively arranged on the first substrate such that the electrically conductive layer is positioned between the first and second dielectric layers.

8. The device of claim 7, wherein the second dielectric layer comprises niobium oxide.

9. The device of claim 7, wherein the second dielectric layer comprises titanium oxide.

10. The device of claim 8, wherein the laminate further comprises a third dielectric layer.

11. The device of claim 10, wherein the third dielectric layer comprises $SiO_x$.

12. The device of claim 1, wherein the layers of the laminate are formed by CVD or PECVD.

13. The device of claim 10, wherein the second dielectric layer has a thickness of from 10 angstroms to 5000 angstroms.

14. The device of claim 10, wherein second dielectric layer has a thickness of from 50 angstroms to 200 angstroms.

15. The device of claim 10, wherein the second dielectric layer has a thickness around 100 angstroms.

16. The device of claim 10, wherein the second dielectric layer has an optical reflection index of from 1 to 2.7.

17. The device of claim 10, wherein the second dielectric layer has an optical reflection index of from 1.5 to 2.5.

18. The device of claim 10, wherein the second dielectric layer has an optical reflection index around 2.3.

19. The device of claim 10, wherein the first dielectric layer has a thickness of from 10 angstroms to 5000 angstroms.

20. The device of claim 10, wherein the first dielectric layer has a thickness of from 50 angstroms to 500 angstroms.

21. The device of claim 10, wherein the first dielectric layer has a thickness around 400 angstroms.

22. The device of claim 10, wherein the first dielectric layer has an optical reflection index of from 1 to 1.7 to the visible light.

23. The device of claim 10, wherein the first dielectric layer has an optical reflection index of from 1.2 to 1.5 to the visible light.

24. The device of claim 10, wherein the first dielectric layer has an optical reflection index around 1.46 to the visible light.

25. The device of claim 1, wherein the electrically conductive and transparent layer has a thickness of from 10 angstroms to 5000 angstroms.

26. The device of claim 4, wherein the indium electrically conductive and transparent layer has a thickness of from 50 angstroms to 1000 angstroms.

27. The device of claim 1, wherein the electrically conductive thin film layer of the light transmissive laminate has a thickness around 600 angstroms.

28. The device of claim 10, wherein the third dielectric layer has a thickness of from 10 angstroms to 5000 angstroms.

29. The device of claim 10, wherein said third dielectric layer has a thickness of from 50 angstroms to 1500 angstroms.

30. The device of claim 10, wherein the third dielectric layer has a thickness of around 900 angstroms.

31. The device of claim 1, wherein the first substrate is transmissive to visible light.

32. The device of claim 31, wherein the second substrate is a semiconductor substrate.

33. The device of claim 31, wherein the mirror plates are formed on the first substrate.

34. The device of claim 31, wherein the mirror plates are formed on the second substrate.

35. The device of claim 1, wherein the mirror plates are single crystal.

36. The device of claim 1, wherein each mirror plate is associated with one single addressing electrode of an array of addressing electrodes.

* * * * *